US008756239B2

(12) United States Patent
Wable et al.

(10) Patent No.: US 8,756,239 B2
(45) Date of Patent: Jun. 17, 2014

(54) REAL TIME CONTENT SEARCHING IN SOCIAL NETWORK

(71) Applicant: c/o Facebook, Inc., Menlo Park, CA (US)

(72) Inventors: Akhil Wable, San Francisco, CA (US); Hong Yan, Mountain View, CA (US); Spencer G. Ahrens, Menlo Park, CA (US); Yofay Kari Lee, Palo Alto, CA (US); Guizhen Yang, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/866,095

(22) Filed: Apr. 19, 2013

(65) Prior Publication Data
US 2013/0246390 A1 Sep. 19, 2013

Related U.S. Application Data

(63) Continuation of application No. 12/704,400, filed on Feb. 11, 2010, now Pat. No. 8,527,496.

(51) Int. Cl.
G06F 17/30 (2006.01)
(52) U.S. Cl.
USPC ............ 707/741; 707/711; 707/737; 707/769
(58) Field of Classification Search
CPC ........................... G06F 17/30321; G06Q 50/01
USPC .................. 707/711, 737, 741, 769, 962, 972
See application file for complete search history.

(56) References Cited

U.S. PATENT DOCUMENTS

| 6,199,067 | B1 | | 3/2001 | Geller | |
|---|---|---|---|---|---|
| 7,389,305 | B1 | * | 6/2008 | Kindig et al. | 1/1 |
| 7,634,466 | B2 | * | 12/2009 | Rose et al. | 1/1 |
| 2011/0106895 | A1 | * | 5/2011 | Ventilla et al. | 709/206 |

FOREIGN PATENT DOCUMENTS

EP 2216743 A1 * 8/2010

OTHER PUBLICATIONS

ISAM methods explained in the Wikipedia article titled ISAM (http://en.wikipedia.org/wiki/ISAM, retrieved Dec. 12, 2013).*

* cited by examiner

Primary Examiner — Shahid Alam
Assistant Examiner — Evan Aspinwall
(74) Attorney, Agent, or Firm — Fenwick & West LLP

(57) ABSTRACT

Indexing and retrieving real time content in a social networking system is disclosed. A user-term index includes user-term partitions, each user-term partition comprising temporal databases. As a post is received from a user, a user identifier, a post identifier, and a post is extracted. An object store communicatively coupled to a temporal database for recently received content is queried to determine whether terms in the post has already been stored. A term identifier is stored in the user-term index with the user and post identifiers. A forward index stores the post by post identifier. Responsive to a search query, the user-term index is searched by the user's connections and the terms. A real time search engine compiles the results of the user-term index query and retrieves the stored posts from the forward index. The search results may then be ranked and cached before presentation to the searching user.

17 Claims, 11 Drawing Sheets

User-term Index portion 500

| User ID | Term ID | Post IDs |
|---|---|---|
| 1 | 057901e7 | 29, 25, 13 |
| 1 | 089f0267 | 25, 13 |
| 2 | 057901e7 | 78, 49 |
| 2 | 0830026c | 78 |

508 — row 1
510 — row 2
512 — row 3
514 — row 4

502 User ID, 504 Term ID, 506 Post IDs

Object store portion 528

| Term ID | Address in Memory | Actual String Term |
|---|---|---|
| 057901e7 | 0123abcd | "Jamie" |
| 089f0267 | 0123abce | "O'Brien" |
| 0830026c | 0123abdc | "Slater" |

516 Term ID, 518 Address in Memory, 526 Actual String Term
520, 522, 524

FIG. 5

| Post ID | User ID | Address in Memory | Post |
|---|---|---|---|
| 78 | 2 | 42fe114a | "Taj wins the pipeline masters, not Jamie or Slater." |
| 49 | 2 | 245ac314 | "Went to lunch with Jamie" |
| 29 | 1 | 014e14ac | "where is Jamie?" |
| 25 | 1 | 1159e312 | "Going to watch Jamie O'Brien surf pipe" |
| 13 | 1 | ce1114a1 | "watching the new Jamie O'Brien movie" |

Forward Index portion
600

FIG. 6

REAL TIME CONTENT SEARCHING IN SOCIAL NETWORK

RELATED APPLICATIONS

This application is a continuation of U.S. patent application Ser. No. 12/704,400, filed on Feb. 11, 2010, which hereby is incorporated by reference in its entirety.

BACKGROUND

The present invention relates generally to social networking systems and more particularly to optimizing the storage architecture of real time content generated on a social networking system for efficient search and retrieval.

Social networking systems provide users with multiple mechanisms to post differing types of content, including text, links, photos, videos, and comments on other users' posts, just to name a few. As a social networking system grows to hundreds of millions of users, the amount of content being stored grows exponentially. Storing the content in primary storage (e.g., memory) yields the fastest retrieval, but primary storage is expensive. Thus, content is eventually stored in secondary storage (e.g., hard disk) which is less expensive, but results in longer access times. Determining which content should be stored in primary storage to enable real time searching is difficult because some content may be accessed frequently while others content is accessed only sporadically.

Conventional document indices for large scale (e.g., web) systems typically ignore the user as a structural indexing attribute. A typical inverted index stores a list of documents for a given term, where the list of document is ordered by document identifier. The user, or more typically the "author" of the document, is simply one of many keys/attributes that are stored with the metadata for the document, but the structure of the index is not organized in memory with respect to the author. In addition, conventional indices typically capture the creation date of when a document was generated as another attribute of the document. For example, a document, or content, that a user authored, or posted, a week ago is conventionally stored and retrieved in the same manner as content posted in the last hour. Users may wish to search the most recently posted content of other users on a social networking system before the content posted a week ago. However, terms may be repeated by users posting content, leading to an inefficient allocation of memory and future fragmentation of computer-readable storage media. Managing a pointer to a single object representing the commonly repeated terms leads to wasteful overhead processing. Additionally, management of old databases becomes complicated, leading to broken links. Thus, conventional search indices are not optimized for real time searching.

Additionally, users of social networking systems may wish to search the content of other users with which they are connected to on the social networking system before searching content of random users of the social networking system. Social networking systems also gather information on the interactions between users to identify stronger connections between users. Conventional social networking systems do not optimize indices to enable ranking of search results according to the strength of connections between users.

SUMMARY

A content storage and retrieval system in a social networking system is structured to use the social graph—where users have connections to each other and other nodes—to structure the content indices. In addition, indices are organized with respect to the real time posting of content, so that content is organized temporally as well as by user. "Content" includes anything that may be stored by a social networking system.

In one embodiment, a user-term index is used. A user-term index is an index of content received in posts from users (or other nodes). A "post" includes all content contained or associated with a particular communication. In one embodiment, the user-term index includes storage partitions, each partition including a plurality of temporal databases (shards). A database shard is a selected group of records, here selected with respect to a time period. Each temporal database includes an index of content received over a certain time period, with the index information arranged by user and term identifiers. The user-term index stores terms from the posts of each user in an inverted manner. In one embodiment, the user-term index stores for each user a posting list containing a list of term identifiers of terms included in one or more posts, and for each term identifier, a list of post identifiers in which the term is found. An object store is a large allocation of addressable memory that stores content, such as a term in a post. A term from a post in a given time period is parsed and indexed into a corresponding temporal database shard in the user-term index, and the term is stored in the object store and is given a term identifier. If the same term appears in a subsequent post authored by the same user and is indexed in the same temporal database shard, the same term identifier is used in the user-term index, and the subsequent post identifier is added to the postings list for that particular user and term. A forward index identifies posts and stores a reference to the physical memory address of where the elements, including metadata, of a post are stored in a content store.

At query processing time, a search query comprising one or more terms is received from a user ("searching user"). The user's connections (e.g. other users or nodes represented in the social networking system that are connected to the user) are identified based on the searching user's profile information. For each such connection, the connection's post list in the user-term index is searched with respect to the query term(s) to identify posts by that connection that contain the query term(s). In another scenario, the user-term index is searched by the query term(s) in the most recent temporal databases of all of the user-term partitions to identify posts by everyone on the social networking system that contain the query term(s). The search or search results may also be filtered, for example, to only show results related to a particular connection or group of connections (groups may be defined or predefined by the user or by the social networking system according to common attributes or other factors). A real time search engine compiles the post identifiers from matching posts in the user-term index query and uses the post identifiers to access the forward index and obtain the storage locations in the object stores for the posts. The search of the user-term indices can be done in parallel across several of the temporal databases. The search results may then be ranked, for example, by relevance and time, and cached before presentation to the searching user.

BRIEF DESCRIPTION OF THE DRAWINGS

FIG. 5 illustrates portions of a user-term index database shard and the corresponding term object store according to one embodiment.

FIG. 6 illustrates a portion of a forward index according to one embodiment.

Figure 1A:
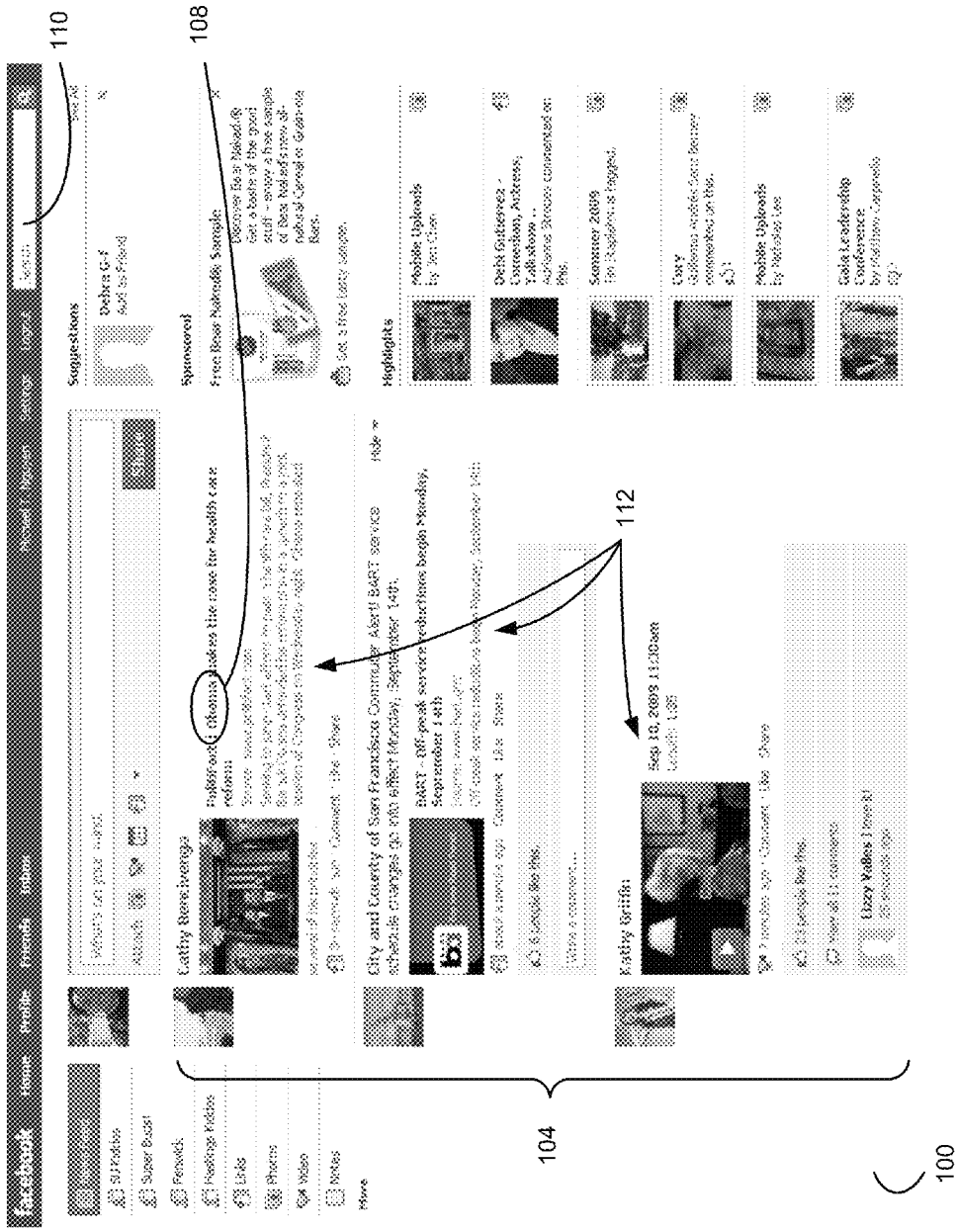
FIGS. 1A-C are examples of querying a real time search engine of a social networking system according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System

A social networking system offers its users the ability to communicate and interact with other users of the social networking system. In use, users join the social networking system and then add connections to other users (individuals and entities) to whom they desire to be connected. As used herein, the term "connection" refers to any other user to whom a user has formed a connection, association, or relationship via the website. The term "user" refers to individuals and entities (such as businesses, products, bands, causes, associations, television shows, fictional characters, etc.) that may exist or be represented in a social networking environment. Connections may be added explicitly by a user, for example, by an individual user selecting another user to be a connection. A connection may also be established by a user for another user, such as an individual user designating a particular entity to be similar to another entity. In this case, a connection between the bands is established by the individual user. Connections may also be automatically created by the social networking system based on common characteristics of the users (e.g., individual users who are alumni of the same educational institution, business entities that sell similar products, restaurants that have similar food, etc.). Users and other entities represented in a social networking system may also be described as "nodes" that are connected, forming a social graph.

Connections in social networking systems are usually in both directions, but need not be. For example, if Nair and Sam are both users and connected to each other on the social networking system, Nair and Sam, both users, are also each other's connections. If, on the other hand, Nair wishes to connect to Sam to view Sam's posts, but Sam does not wish to form a mutual connection, a one-way connection is also possible. The connection between users may be a direct connection; however, some embodiments of a social networking system allow the connection to be indirect via one or more levels of connections or degrees or separation. Also, the term connection need not require that users actually be connections in real life, (which would generally be the case when one of the users is a business or other entity); it simply implies a connection in the social networking system.

In addition to interactions with other users, the social networking system provides users with the ability to take actions on various types of items supported by the website. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system, transactions that allow users to buy or sell items via the service, and interactions with advertisements that a user may perform on or off the social networking system. These are just a few examples of the items upon which a user may act on a social networking system, and many others are possible. A user may interact with anything that is capable of being represented in the social networking environment or the Internet at large. A social networking system is capable of linking nodes that are not confined to a particular social networking website. A social networking website may be one part of a larger social networking system that enables users of the website to interact with each other as well as with nodes on the Internet at large through an API or other communication channels. Though many of the embodiments/examples provided below are directed to a social networking system, the invention described herein is not limited to a social networking system, but can include other environments involving social networking systems, social content, other types of websites and networks (including private networks, local networks, mobile networks and devices, etc.).

User generated content on a social networking system enhances the user experience. User generated content may include anything a user can add to the social networking system through any kind of post, such as status updates or other textual posts, location information, photos, videos, links, music, and the like. Content may also be added by a third-party to a social networking system "communication channel," such as a newsfeed or stream. Content "items" represent single pieces of content that are represented as objects in the social networking system. In this way, users of a social networking system are encouraged to communicate with each other by posting text and content items of various types of media through various communication channels. Using communication channels, users of a social networking system increase their interaction with each other and engage with the social networking system on a more frequent basis.

Communication channels may comprise one or more different information delivery methods, such as a stream, a feed, a wall post, an email communication, a private message, a comment on a post, a mobile application, a note, a third-party application, a text message, a third-party website, an advertising communication channel, a discussion board, or any other communication channel that exists or is associated with the social networking system. Communication channels are discussed further in U.S. patent application Ser. No. 12/253, 149, filed on Oct. 16, 2008, which hereby incorporated by reference in its entirety.

Overview of Real Time Search for Posts

As a social networking system gains popularity, the number of users of the service increases dramatically, and consequently, the number of posts on the social networking system increases exponentially. These posts may fill up a user's newsfeed stream or other communication channel very quickly. Users of a social networking system may wish to query the service to view what their connections are posting in real time. For example, if a user is attending an upcoming concert featuring Steel Pulse, the user may wish to query the posts of his connections to see if they are also going to the Steel Pulse concert.

Figure 1B:
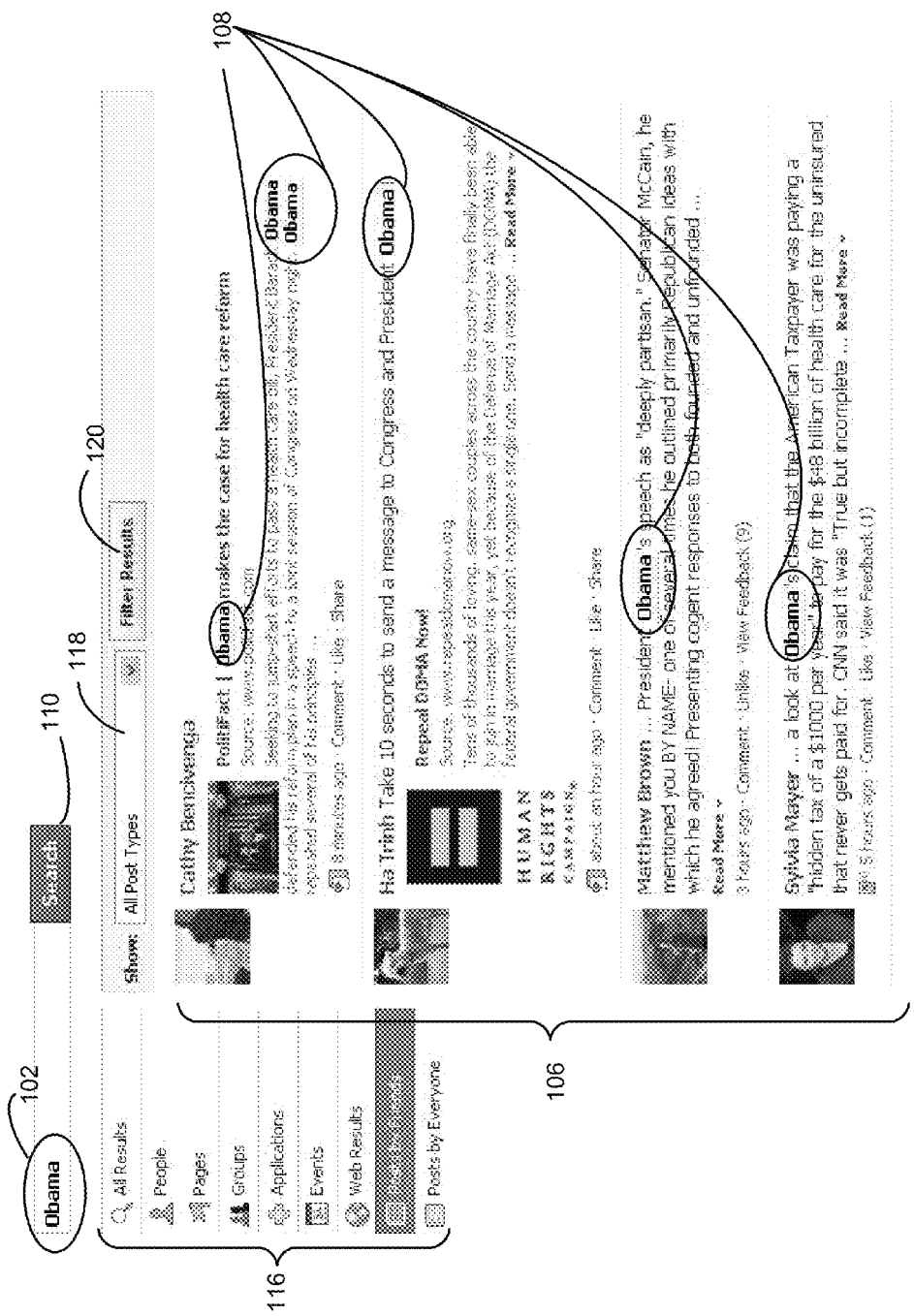
Figure 1C:
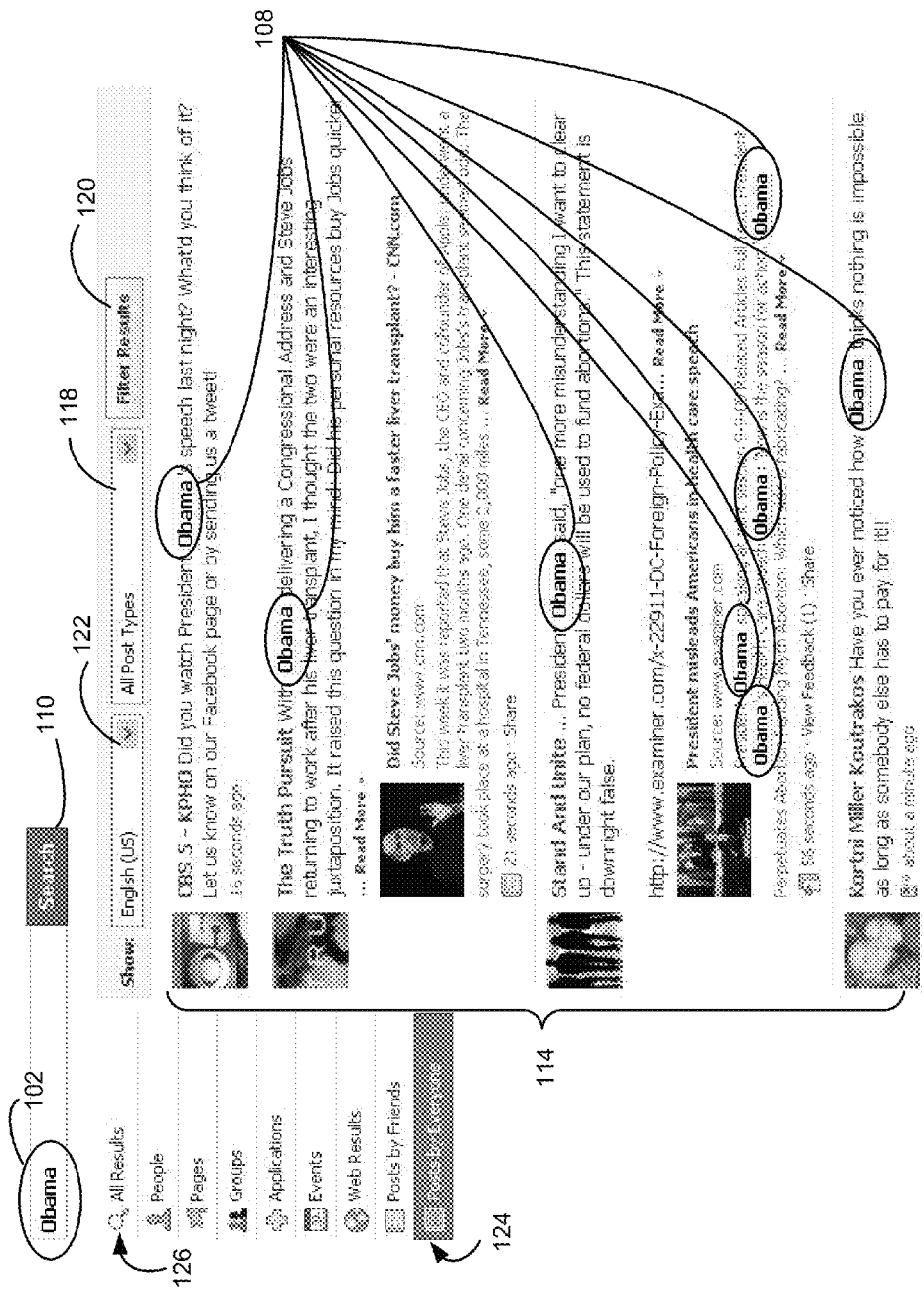

FIGS. 1A-C illustrate an exemplary user interface for querying a real time search engine of a social networking system. The social networking system presents a user interface 100 for a user that includes posted by other members of the social networking system. As shown in FIG. 1B, in a social networking system, a user may enter a query 102 for a term, such as "Obama." Before executing a search query, the user may have an unfiltered view 104 (see FIG. 1A) of the posts 112 recently uploaded to the social networking system. The unfiltered view 104 would be shown to the user on a client device. Only some of the posts 112 may include the term 108 being queried. However, before the search query 102 is executed, some of the older posts that include the relevant term 108 may not be viewable to the user because newer posts that do not include the relevant term 108 are presented in the user interface before the older posts. For example, FIG. 1A shows a screenshot of a user interface with multiple posts presented in the user interface. However, only one post contains the relevant term 108 "Obama." Thus, a searching user may wish to view posts made by his connections that include the term "Obama" and input 110 the term into the real time search engine in the user interface.

A real time search engine receives a query 102 from a user's client device for one or more terms that may appear in posts. The real time search engine executes the query 102 for the term 108 and aggregates the posts that contain the term 108 being queried. As illustrated in FIG. 1B, the real time search engine then communicates this filtered view 106 of posts to the user's client device. Thus, in the example above, a query 102 for the term "Obama" may be executed by the real time search engine. As a result, a filtered view 106 of posts containing the term 108 "Obama" would be presented to the user through a communication channel such as a stream, news feed, ranked search results, etc. FIG. 1B illustrates the search results of the query 102 for "Obama" among the posts that are further filtered to only include posts made by the searching user's connections. FIG. 1C illustrates the search results of the query 102 for "Obama" among all posts by everyone on the social networking system. A filtered view 114 shows posts including the term 108 "Obama" that were posted by everyone on the social networking system. Using this real time search engine, a searching user is able to query his or her connections as well as everyone on the social networking system, in one embodiment, to view relevant posts.

FIGS. 1B-C also illustrate filtering options that are presented to the user after the initial search results have been returned. As shown in FIG. 1B, a filtering interface 116 may be provided to filter the search results. In FIG. 1B, the currently selected filter is "Posts by Friends." Thus, the filtered view 106 shows posts that were made by the searching user's friends.

In one embodiment, users may further narrow search results using a dropdown menu 118. For example, FIG. 1B shows that two connections have posted links to external websites that contain the relevant term, "Obama." If the searching user wanted to only see posted links from connections, the dropdown menu 118 may be selected to indicate the user's preference. The filter results button 120 may be selected to perform the filtering. Note that the dropdown menu 118 and filter results button 120 may also be used when viewing posts by everyone on the social networking system. Other types of posts, such as status updates, wall posts, photos, videos, notes, third party applications, network, custom lists, etc., may also be selected in the post type dropdown menu 118.

In FIG. 1C, the filtering interface 116 indicates that the "Posts by Everyone" filter 124 has been selected. The "All Results" filter 126 may also be selected to view search results across various nodes in the social networking system, such as people, pages, groups, applications, events, and posts. Because many types of languages may be used in a social networking system, search results may also be filtered by language by using a language dropdown menu 122. Other types of filters not shown may apply certain ranking criteria to the search results, such as a personalized ranking of the search results for the searching user. Moreover, the system itself may apply various algorithms to determine what the user might be most interested in or posts which are the most closely related to the user (e.g., in the social graph). However, the most relevant posts may be presented to the user by giving the user the freedom to select certain filtering criteria.

System Architecture

Figure 2:
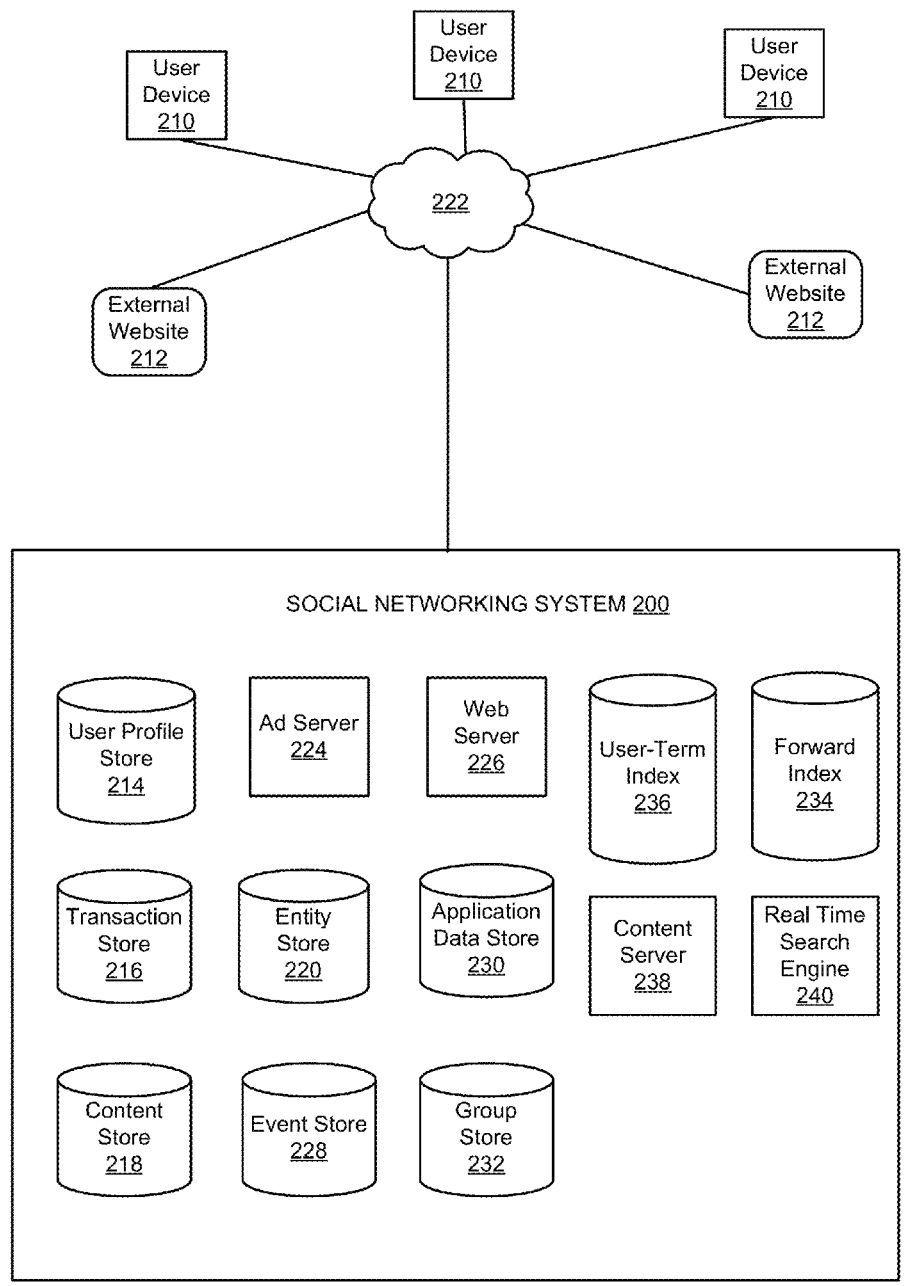
FIG. 2 is a high-level block diagram of the system architecture of a social networking system according to one embodiment.

FIG. 2 is a high level block diagram illustrating a system environment suitable for operation of a social networking system 200. The system environment includes one or more user devices 210, one or more external websites 212, a social networking system 200, and a network 222. In alternative configurations, different and/or additional modules can be included in the system.

The user devices 210 comprise computing devices that can receive user input and can transmit and receive data via a network 222. For example, the user devices 210 may be desktop computers, laptop computers, smart phones, cell phones, personal digital assistants (PDAs), or any other device including computing functionality and data communication capabilities. The user devices 210 are configured to communicate via network 222, which may comprise any combination of local area and/or wide area networks, using both wired and wireless communication systems.

FIG. 2 illustrates a block diagram of the social networking system 200. The social networking system 200 includes a web server 226, an ad server 224, a forward index 234, a user-term index 236, a content server 238, a real time search engine 240, a user profile store 214, an entity store 220, an application data store 230, a transaction store 216, a content store 218, an event store 228, and a group store 232. In other embodiments, the social networking system 200 may include additional, fewer, or different modules for various applications. Conventional components such as network interfaces, security mechanisms, load balancers, failover servers, management and network operations consoles, and the like are not shown so as to not obscure the details of the system.

The social networking system 200 includes a computing system that allows users to communicate or otherwise interact with each other and access content as described herein. The social networking system 200 stores in the user profile store 214 user profiles that describe the users of a social networking system, including biographic, demographic, and other types of descriptive information, such as work experience, educational history, hobbies, interests, location, and the like.

Additionally, the user profile store 214 includes connections between different users and other nodes within and outside of the social networking system, and may also allow users to specify their relationships with others. For example, these user connections allows users to generate relationships with other users that parallel the users' real-life relationships, such as connections, co-workers, partners, and so forth. Users may select from predefined types of relationships, define their own relationship types as needed, or do nothing at all.

Regardless, the system tracks and stores all of these relationships. Privacy settings may be implemented by the social networking system to enable users to publish posts to user-specified connections and/or groups of connections. These privacy settings may be configured by the user based upon the relationships types defined by the user or by groups of connections selected by the user. As a result of these privacy settings, certain posts may be limited to specified connections and/or groups of connections.

A user (or other type of node) may have a particular affinity, which may be represented by an affinity score, for another node on a social networking system. In this context, an affinity score indicates the strength of correlation or interest between a user and another node in the social networking system (or the Internet at large). Affinity scores for a user's connections are stored in the user profile object for that user in the user profile store 214. As indicated above, a node may be a user, entity, or any other object with which a user may engage and interact on or through a social networking system. Methods for determining affinities between users of a social networking system are described further in U.S. application Ser. No. 11/503,093, filed Aug. 11, 2006, which is hereby incorporated by reference in its entirety.

The social networking system 200 maintains (or uses a third party to maintain) data in a database about a number of different types of objects with which a user may interact on the social networking system 200, including posts, entities, events, applications, groups, transactions, etc. To this end, each of the user profile store 214, the content store 218, the entity store 220, the event store 228, the application data store 230, the group store 232, and the transaction store 216 stores a data structure in a database to manage the data for each instance of the corresponding type of object maintained by the website 200. The data structures comprise information fields that are suitable for the corresponding type of object. For example, the event store 228 contains data structures that include the time and location for an event, whereas the user profile store 214 contains data structures with fields suitable for describing a user's profile. When a new object of a particular type is created, the service 200 initializes a new data structure of the corresponding type, assigns a unique object identifier to it, and begins to add data to the object as needed. Thus, when a user makes a new post, such as providing a photograph, the social networking system 200 generates a new instance of a post object in the content store 218, assigns a unique identifier to the post, begins to populate the fields of the post with information provided by the user, such as who is tagged in the photo. Subsequently after the post is made, users interacting with the post, can add further information to the data structure, such as comments and other tags created by other users.

An ad server 224 generates and delivers advertisements to user devices 210. In one embodiment, an ad server 224 may access the various filters created by users and/or automatically created by the social networking system 200. An analysis of the filters may help advertisers develop better marketing campaigns through more selective targeting techniques utilizing information about users' preferred filters. Targeting advertisements are further described in a related application, U.S. application Ser. No. 12/195,321, filed Aug. 20, 2008, which is hereby incorporated by reference in its entirety.

The web server 226 links the social networking system 200 via the network 222 to one or more user devices 210; the web server 226 serves web pages, as well as other web-related content, such as Java, Flash, XML, and so forth. The web server 226 may include a mail server or other messaging functionality for receiving and routing messages between the social networking system 200 and the user devices 210. The messages can be instant messages, queued messages (e.g., email), text and SMS messages, or any other suitable messaging technique. In another embodiment, the social networking system is implemented on an application running on a user device 210 that accesses information from the social networking system using APIs or other communication mechanisms. A content server 238 serves the posts to the user when the user logs into the social networking system 200.

The real time search engine 240 builds, maintains, and queries the forward index 234 and user-term index 236. A forward index 234 includes an index of the posts received by the social networking system 200. As a post is received by the web server 226, the forward index 234 stores information about the post, including the user identifier associated with the author and all content contained in and associated with the post. A term may be extracted from any portion of a post in response to a search query, including information that is not visible to the user, such as metadata. Terms are identified in an index to become searchable in subsequent queries. Terms that may be indexed include any content in or associated with a post. Examples of where terms might be found include text, links, attachments, URLs, keywords stored as metadata, IP addresses, user ID, a nickname associated with the user, or other information the system has or can predict about or relate to the posting user or the subject matter of the post.

Types of posts include status updates, links to external websites, user generated videos and photos, and the like. Terms may be found, for example, in text entered by a user, previewed text from a website that is linked, a caption of a photo posted, a posted URL, the title or content of an article posted, etc. These posts are indexed in the forward index 234 and user-term index 236. Applications in a social networking system 200 may access the forward index 234 to retrieve a post from the content store 218 based on the post identifier assigned to it by the forward index.

The system may also associate terms that are synonymous or closely related to a term extracted from a post. For example, a post that reads "Go Niners" will index the term "Niners," but may also index "Forty-Niners," "9ers," "49ers," etc. In some embodiments the system may also index related words, such as "football," "San Francisco," "Candlestick," etc. The system may also use voice, video or image recognition technology to extract or create terms relevant to content contained in a post. Additionally, the system employs tokenization, normalization, and expansion of terms extracted from a post. Tokenization refers to the process of stripping and splitting terms on punctuation and normalizing words with accents, acronyms, and possessives (e.g., "jon's" becomes "jon" & "jons"). Normalization refers to truncating words to their base (e.g., "running" becomes "run"), while expansion includes expanding a term to include additional forms (e.g., "run" becomes "running," "runs," & "runner").

A user-term index 236 is an inverted index organized by user identifiers and then by term identifiers of terms appearing in the posts made by each user. In building the user-term index 236, several storage partitions may be used. Each user of the social network service 200 is hash mapped to one of the storage partitions, based on the user identifier. When a user to the social networking system 200, the user-term index 236 references the terms contained in the post in the particular storage partition for the user. For each term, a posting list of the post identifiers of that user's posts in which the term appears is stored in the user-term index 236. FIG. 5 illustrates in more detail one embodiment of the user-term index 236.

A user wishing to query posts made to the social networking system for certain terms, such as "Obama" in the example above, may execute the query through the web server 226. The real time search engine 240 receives the user's query of terms and performs the query by querying the user-term index 236 with the user identifier of the searching user and the terms of the query. Terms may be entered manually, and a user may choose between terms adaptively suggested by the system in response to the inputted text. Other methods of inputting terms may also be used, such as the selection of terms recently searched by other users in the social networking system. The user-term index 236 compiles the post identifiers of those posts by the user's connections that include the terms in the user's query. The real time search engine 240 receives the results of the search from the user-term index 236 and retrieves relevant posts from the forward index 234 for presentation to the user.

Real Time Search Engine

Figure 3:
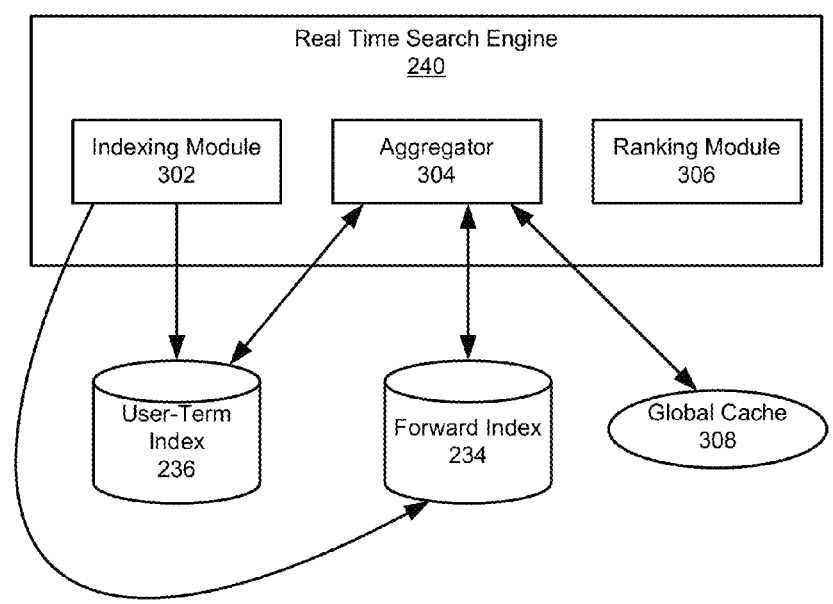
FIG. 3 is a schematic of the real time search engine and user-term and forward indices according to one embodiment.

FIG. 3 illustrates the interaction of the modules of the real time search engine 240 interacting with the user-term index 236, forward index 234 and global cache 308. A global cache 308 may contain the search results for the most recent queries, search results for the most popular searches, a combination of the foregoing, or other useful results. In one embodiment, a real time search engine 240 does not have a global cache 308.

An indexing module 302 receives posts and extracts information from the posts 112, including the author's user identifier and the terms of the post. The indexing module 302 stores the post terms in the user-term index 236 as described above, and stores the user identifier, the post identifier, and other useful metadata in the forward index 234. Such useful metadata may include, for example, the number of terms in the post, the author of the post, the date and time of the post, positional information of the terms, and the like.

An aggregator 304 receives a query 102 from a user of the social networking system 200. The aggregator 304 extracts the searching user's user identifier, and then uses that identifier to determine a list of the searching user's connections in the social networking system 200. Using the query 102 and the connections list, the aggregator 304 gathers posts from the most recent shards of the user-term index 236 that satisfy the query 102. The aggregator 304 hashes the user identifier of each connection to determine which partition holds the database shards associated with that connection. The aggregator 304 then assembles the posts that contain the term posted by that connection to be presented to the user. A user may also perform searches that are not limited in scope to the searching user's connections, such as a search on posts of all users of the social networking system and a search of all nodes connected to the social networking system. Moreover, the system can also provide an interface to limit search results to those posts made within a specified period of time (e.g. recent posts, posts within the last week, posts within the last year, posts made at any time, etc.). The searching user may limit the scope of the search at the outset, or may filter the results after a search is performed using this interface.

As an example, a query for "Obama" is performed by Suzie. Suzie has two connections in the social network 200, Jeannie and Oliver. The aggregator 304 gathers posts by Jeannie and Oliver that contain the term "Obama" in the most recent shards of the user-term index 236. In one embodiment, the aggregator 304 gathers the posts from the most recent shards of the user-term index 236 satisfying the search query 102 for all users on the social networking system 200. The aggregator 304 may also query older databases in the user-term index 236 depending on whether enough posts have been retrieved. In one embodiment, the search results are updated in real time as newer posts are uploaded to the social networking system.

The real time search engine 240 also includes a ranking module 306. A ranking module 306 may comprise various ranking criteria used to rank the search results. For example, the ranking module 306 may comprise ranking criteria such as reputation, interaction by population (i.e., "popularity" ranking), and similarity measures between content/content author and the searching user (i.e., location, age, gender, etc.). Determining what information is relevant may differ from user to user. Various methods of determining what might interest a particular user may be implemented to rank search results. Moreover, in one embodiment, if no search results are found for a user's connections, the system will provide search results from other users of the social networking system. In other embodiments, search results may also include results from outside the social networking system, such as from third party websites. Search results may also contain advertisements or other paid or non-paid commercial content. Further information about ranking the search results is described below.

Index Architecture

Figure 4:
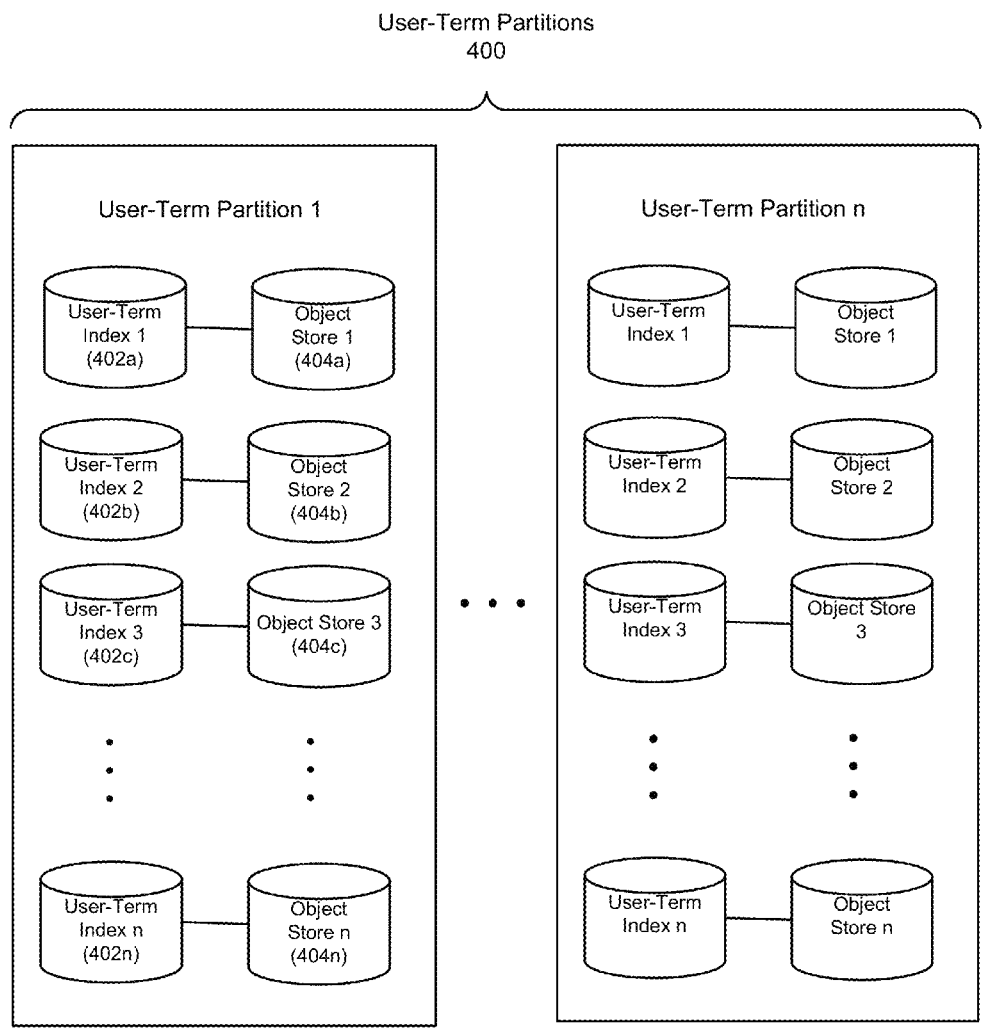
FIG. 4 illustrates the storage partitions of the user-term index according to one embodiment.

As illustrated in FIG. 4, the user-term index 236 is comprised of a plurality of user-term partitions 400 (i.e., user-term partitions 1 through n). A partition is a logical or physical allocation of storage on a computer-readable storage medium. In one embodiment, the number of user-term partitions 400 implemented is a prime number to achieve an even distribution of users across the user-term partitions 400. The users of a social networking system 200 are assigned to specific user-term partitions using a hash function.

For example, a user identifier may be hashed into one of thirteen partitions by taking the modulo of the user identifier by the number of partitions (e.g., 170 mod 13). The modulo operation is the remainder of a division operation. So, the operation "170 mod 13" would result in "1" because the remainder of 170 divided by 13 is 1. Any number of partitions may be used. Within each user-term partitions 400 there are a plurality of temporal database shards 402, each of which holds a time-specific portion of the user-term index (i.e., user-term indices 1 through n, corresponding to shards 402a to 402n). The temporal database shards 402 are organized by time such that the posts indexed in database shard i+1 in their corresponding partitions 400 were posted most recently in time than posts in database shard i. A new post being stored in the forward index 234 is also indexed in the user-term index 236 in the most recent database shard 402n, depending on the user identifier 124 for the post. Any number of databases 402 may be used in each user-term partition 400. In one embodiment, thirty (30) databases shards 402 are used for each of the user-term partition 400, one database shard for each day of a month. In other embodiments, twelve (12) database shards are used, one shard for each hour. In one embodiment, the number of temporal databases used may fluctuate over time.

When indexing a post, the terms in the post are parsed and stored in the user-term partition 400 for the author's user identifier. As new posts are received, extracted information, such as the author's user identifier, the parsed post's term identifiers, and post identifiers, are stored in the most recent shards 402n, until these shards are filled to capacity. At some point, a new empty shard is created, and the oldest shard (e.g., shard 402a) in the storage partition is deleted. For example, if it is determined that the most recent shard 402n is at full capacity, a new shard is created and the oldest shard 402a is deleted. In this way, the most recent posts may be quickly stored to a database in memory.

As the user-term index 236 fills in capacity, the indexing module 302 determines whether a new shard for a particular user-term partition 400 should be created. The decision to create a new shard is a design choice dependent on the physical storage capacity of the computer-readable storage medium, among other factors. If a new shard is created, then the new shard 402(n+1) becomes the most recent shard. If a new shard is not created, then the most recent shard remains the same. The decision to create a new shard is a separate process that monitors the size of the shard and creates a new one as needed.

Also illustrated in FIG. 4 in each user-term partition 400 are object stores 404a-n. An associated object store is communicatively coupled to each of the database shards 402. An object store is a large allocation of memory that is addressable. By having an object store associated with each database shard 402, management of the term identifiers for terms stored in the database shard is simplified. Therefore, when the oldest shard is deleted to make room for a new shard, the object store associated with the oldest shard is deleted as well and a new object store is associated with the new shard.

Each of the object stores 404a-n includes the terms used in the posts indexed in the user-term indices 402a-n. When a new post is indexed in the most recent database shard 402n, the hashes of the terms in the post are searched in the object store corresponding to the most recent database shard 402n. If the hash of a term is not found in the object store, it is added to the object store. If the hash of a term is found in the object store, then term identifier is indexed in the database shard 402n. In this way, the database shards 402 are organized by user and by term. Metadata about the new post, including its post identifier as assigned by the forward index 234, is also stored in the most recent database shard 402n.

For example, a post, such as a status update, may include the text "is listening to John Mayer right now." This post would have five (5) indexable terms (because the terms "is" and "to" would not be indexed) that would each be hashed into the corresponding object store for the user-term partition and indexed in the most recent database shard 402n. If the terms were found in the object store corresponding to the most recent shard, then the corresponding term identifiers for the terms would be stored with the metadata for the post. In this case, the metadata includes the user identifier for the user who posted the status update and the post identifier that identifies the status update post in the forward index 234. If terms were not found in the object store corresponding to the most recent shard, then those terms would be stored in the object store and corresponding term identifiers would be stored with the metadata in the most recent database shard 402n. Although this example uses a status update post, other types of posts may be similarly indexed such that each term in or associated with the post is indexed into the user-term index 236.

In one embodiment, when the real time search engine receives a query from a searching user, the user-term partitions corresponding to user identifiers for the searching users' connections must first be identified. Returning to the example above, a query from Suzie for "Obama" is received by the real time search engine. The aggregator 304 gathers posts from the user-term index 236, by hashing user identifiers for Suzie's connections to identify the user-term partitions that are associated with Suzie's connections, Jeannie and Oliver. The query for "Obama" would be performed on the most recent database shard 402n that corresponds to Suzie's connections, Jeannie and Oliver. Thus, the term "Obama" is searched by its hash in the most recent database shard in the user-term partition for Jeannie and also searched in the most recent database shard in the user-term partition for Oliver. The hash of "Obama" corresponds to the term identifier for "Obama." The search results, including the post identifiers for posts that contain the terms, are compiled by the aggregator 304 so that the posts may be assembled. Using the post identifiers as a lookup, the store locations of the posts in the object store are found in the forward index 234. The aggregator 304 then retrieves the posts containing the terms from the object store. In one embodiment, the global cache 308 stores the search results.

FIG. 5 illustrates portions of a user-term index database shard and an object store corresponding to the shard in one embodiment. The user-term index 500 includes records 508, 510, 512, and 514 of data. The first column 502 of data represents the user identifier of the author who composed the post. The second column 504 of data represents the term identifier, or hash, of a term found in the post. The third column 506 of data represents the post identifiers in which the term is found. For example, in the first record 508 of the user-term index 500, a user with an identifier of "1" uploaded a post with a term identifier of "057901e7" in the posts identified by the identifiers "29," "25," and "13."

FIG. 5 also illustrates a portion of the object store 528 associated with the portion of the user-term index 500 in one embodiment. The object store 528 includes records 520, 522, and 524 of data. The first column 516 of data represents the term identifiers of the terms and the actual location in memory where the term is stored. The second column 518 of data represents the hashed term. For illustration purposes, a third column 526 shows an actual text string that is stored in memory. For example, in the first record 520 of the object store 516, the term identifier "057901e7" represents the term "Jamie," hashed as "057901e7." In other embodiments, a physical address in memory is referenced in the object store. As an example, the object store portion 528 shows the address of term identifier "057901e7" as "0123abcd."

The object store is a large allocation of memory that is addressable. Instead of randomly allocating memory, which might lead to fragmentation, the object store allocates storage serially. The object store allocates arrays, so the data string "Slater" can be allocated 6 bytes. Then the physical address in memory where "Slater" is stored is passed as a reference. The reference only occupies 4 bytes. Thus, the 6 byte string is converted to a 4 byte reference. The next term to be stored, such as "Irons," is allocated the next 5 bytes. Similarly, user identifiers are stored using an object store (user profile store) to pass 4 byte references, and post identifiers are also stored in an object store (content store) to pass 4 byte references. Other information may be stored in object stores, such as metadata and forward index data blobs, to assign a unique identifier for each piece of information.

As part of a post, term metadata, such as where the term is positioned in the post, the time and date of when the post was made, the post type (i.e., photo, video, status message, etc.), locale of the user, geographic location at the time of the post, etc., can fit into an array that only occupies 4 bytes most of the time. If there are multiple pieces of term metadata, then a list of metadata can be created and a 4 byte reference to the list can be appended to the post identifier. Thus, the post identifier reference and the term metadata can be passed as a reference that occupies 8 bytes. This type of reference passing is useful because servers utilize a 64-bit architecture (8 bytes), but only 32 bits (4 bytes) are needed for the post identifier, the user identifier, and the term identifier. Thus, retrieval of the post and how it was presented, i.e., the post identifier and the term metadata that fits in 8 bytes, can be executed very quickly because the data is store in inline memory. In contrast, conventional methods of storing a term employ a pointer to a physical address in memory. Pointer management, which wastes processing resources, is thus avoided by utilizing the object store.

FIG. 6 illustrates a portion of the forward index in one embodiment. The forward index 600 includes records 608, 610, 612, 614, and 616 of data. The first column 602 of data represents the post identifiers of posts made to the social networking system 200. The second column 604 of data represents the user identifiers of the users who authored the posts. The forward index 600 is indexed based on the first column 602 of data that represents the post identifiers and is not indexed based on the user identifiers in the second column 604 of data. The third column 618 of data represents the physical address in memory where the data is stored. The fourth column 606 of data represents the post stored in memory. The third column 618 may comprise the physical addresses in memory where the posts are stored. For example, the first record 608 of the forward index 600 has a post identifier "78" for a post that was authored by the user identifier "Joe" in which the post reads "Taj wins the pipeline masters, not Jamie or Slater." The full text of the post may not be stored in the forward index 600, but the full text is illustrated in FIG. 6 in the fourth column 606 for purposes of illustration. The forward index 600 also stores metadata about the post (not illustrated in FIG. 6), including enough information about the post to recreate it with the data that is commonly available in local memory, such as cache memory, as well as other metadata used for filtering, such as locale, geographic location, post type (photo, note, status update, etc.). Similarly, the second column 604 of data representing the user identifiers of the user who authored the posts is depicted in FIG. 6 for illustration purposes only and may not be stored as part of the forward index 600, but rather as part of the post itself.

Thus, both the user-term index 236 and the forward index 234 are utilized in the storage and retrieval of terms for real time content searching. FIGS. 5 and 6 will be referenced as examples in the flowcharts of FIGS. 7 and 8.

Indexing and Retrieving Methods

Figure 7:
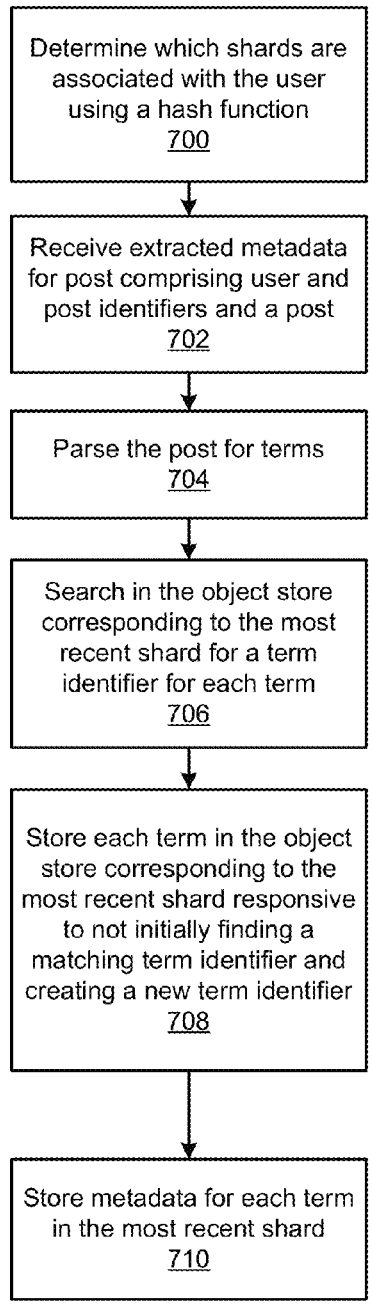
FIG. 7 is a flow chart describing the process of storing posts for real time searching according to one embodiment.

FIG. 7 further illustrates the process of indexing content for real time searching according to one embodiment. As a post is made to the social networking system, the authoring user's identifier is hashed to determine 700 which user-term partition, storing a group of shards, or temporal databases is associated with the authoring user. For example, suppose Suzie posts a link to an external website with the post "Going to watch Jamie O'Brien surf pipe" Suzie's user identifier, "1" in FIGS. 5 and 6, would be hashed to determine which of the user-term partitions is associated with Suzie. Returning to FIG. 7, extracted metadata is received 702 for a post. In one embodiment, the extracted metadata includes user and post identifiers. The post includes at least one term. The post is parsed 704 for terms. Thus, metadata about the post in this example, including the user and post identifiers for the post, "1" and "25" according to record 616 of the forward index 600 portion illustrated in FIG. 6, would be extracted and the terms in the post would be parsed 704.

Each term in the post would be searched, or hashed 706, the object store corresponding to the most recent shard for a term identifier. A separate process determines whether a new shard should be created asynchronously from the process of indexing content for real time searching. This separate process also decides when to delete or archive old shards to free up storage resources, both in memory and on disk. Each term is stored 708 in the object store corresponding to the most recent shard responsive to not finding a matching term identifier in the object store. For each of these stored 708 terms, a new term identifier is created. Metadata is also stored 710 for each term in the most recent shard. This unique term identifier system is related to a pending application, titled "Lock-Free Concurrent Object Dictionary," U.S. Ser. No. 12/651,296, filed on Dec. 31, 2009, and incorporated herein by reference.

Figure 8:
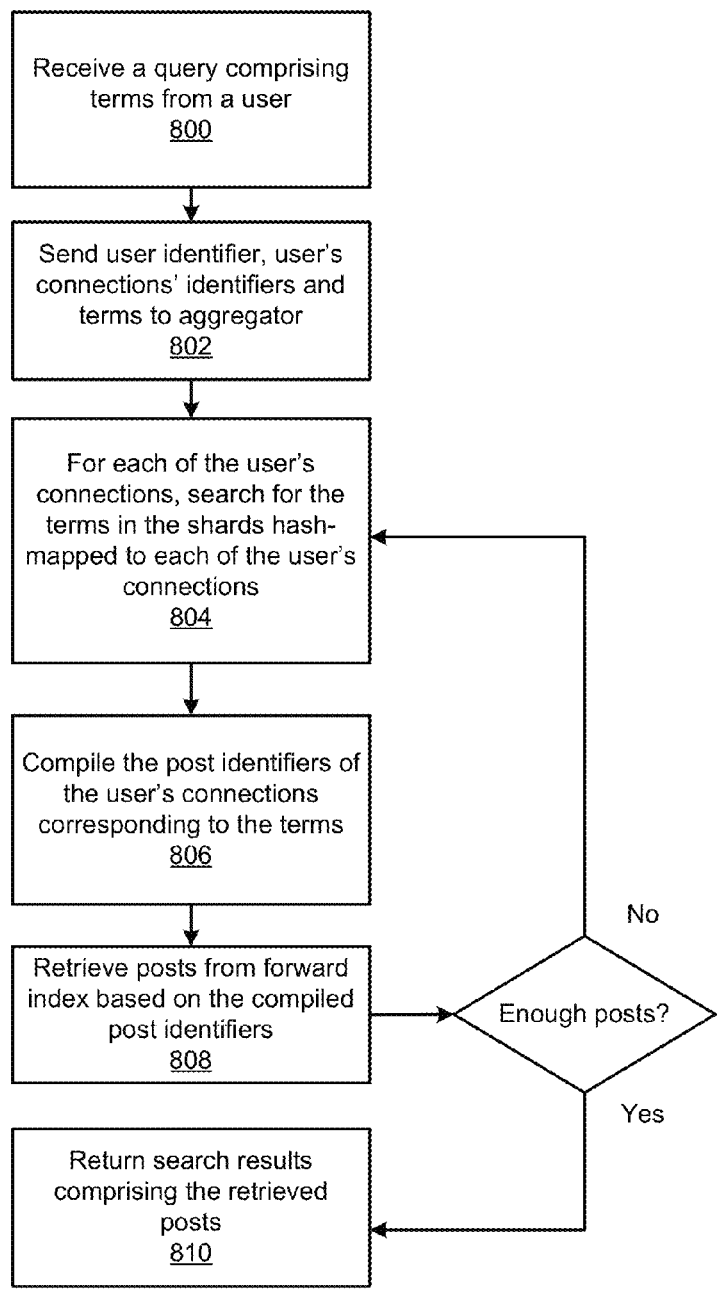
FIG. 8 is a flow chart describing the process of retrieving posts in executing a real time search according to one embodiment.

FIG. 8 further illustrates an embodiment of the process of retrieving content in executing a real time search according to one embodiment. A search query is received 800 comprising terms from a user. The corresponding user identifier of the searching user, a list of user identifiers for the user's connections, and the terms are sent 802 to an aggregator module 304 within the real time search engine 240. Based on the identifiers of the user's connections, the aggregator module 304 can hash each user identifier to identify the user-term partitions that contain the temporal databases associated with the user's connections, as described above.

For each of the user's connections, the terms are queried, or searched 804, in the shards of the corresponding groups of shards contained in the user-term partitions that constitute the user-term index 236, starting with the most recent shards. As described above, this search 804 may include a hash of the term to the corresponding object store associated with the most recent database shard.

The post identifiers for posts made by the user's connections that match the terms are compiled 806. As matches are identified in the search 804, the corresponding post identifiers for the search results may be compiled by the aggregator module. The posts that contain the matching terms are retrieved 808 from the forward index 234 based on the compiled post identifiers. If there are enough retrieved posts from the search of the most recent shard, then the search results are returned 810 to the user. If there are not enough posts, then additional searches 804 are performed in progressively older shards until enough posts are retrieved. The threshold for what constitutes enough posts is a design parameter that is determined by the administrators of the system.

As an example, suppose a user wanted to search his connections (which include Suzie and Joe) for posts with the terms "Jamie O'Brien." The search query is received 800 and the corresponding user identifier of the searching user, a list of user identifiers for the user's connections, and the terms are sent to the aggregator module. The aggregator module 304 would identify which of the user-term partitions 400 are associated with Suzie and Joe. Suppose that both Suzie and Joe are associated with the same user-term partition and that the most recent database shard is illustrated as the user-term index 500 of FIG. 5. Thus, the terms "Jamie" and "O'Brien" would be queried in the user-term index 500.

The terms "Jamie" and "O'Brien" are searched 804, or hashed, in the object store corresponding to the most recent database shard first, illustrated as the object store 528 in FIG. 5. As more posts are needed, searches may be performed in progressively older shards. Thus, the term "Jamie" is hashed as the term identifier "057901e7," and the term "O'Brien" is hashed as the term identifier "089f0267." Thus, these term identifiers are searched in the user-term index 500. Records 508 and 512 both include term identifier "057901e7" while record 510 includes term identifier "089f0267." However, the only post identifiers that are in all of the records 508, 510, and 512 are post identifiers "25" and "13." Thus, these post identifiers are compiled 806. The posts can be retrieved 808 from the forward index 234, illustrated as the forward index 600. The post identifiers "25" and "13" are associated with the posts "Going to watch Jamie O'Brien surf pipe" and "watching the new Jamie O'Brien movie" which were both authored by Suzie, having user identifier "1," as illustrated by the records 614 and 616 in FIG. 6.

Ranking and Caching Search Results

As further illustrated in FIG. 8, the search results comprising the retrieved posts are then returned 810 to the user. Presentation of the search results to the user may vary depending on the preferences of the user or the system. For example, the user may not have many connections using the social networking system and would like to search everyone on the social networking system. After the search results are returned 810 to the user, the user may wish to change the filter to a view of the search results of everyone on the social networking system. This change of filter is a new search against the entire user-term index, searching for the query in the most recent database shards. This is further illustrated in FIG. 9 in which a query comprising terms is received 900 from a user, the user identifier and terms are sent 902 to an aggregator module, the terms are searched 904 in the most recent shards of the user-term index, the post identifiers corresponding to the terms are compiled 906, the posts are retrieved 908 from the forward index, the search results comprising the retrieved posts are returned 910 to the user. Similar to the process in FIG. 8, if more posts are needed, a search is performed against progressively older shards. Depending on the query, other users may have made relevant posts after the searching user requested the query. An independent process may update the search results to enable the user to quickly view newer search results in real-time.

Figure 9:
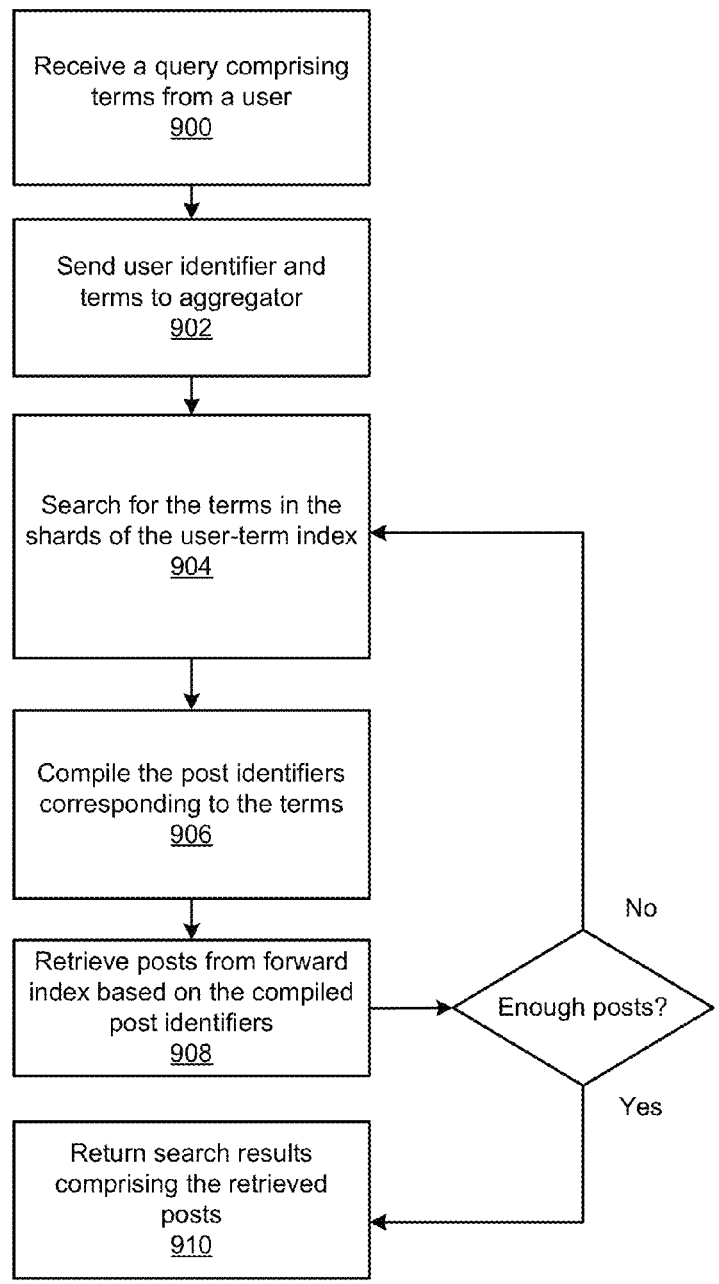
FIG. 9 is a flow chart describing another process for retrieving posts in executing a real time search according to one embodiment.

Search results from the processes illustrated in FIGS. 8 and 9 may be ranked by a ranking module 306. The real time search engine 240 may rank the search results using the ranking module 306 before the search results are returned 810 to the user. Using various ranking criteria, the search results may be reordered to ensure the most relevant information is presented to the user. For example, search results may be ranked by first displaying posts from direct connections, then other users that are indirectly connected to the searching user, then random users, and, in one embodiment, third party content published outside of the social networking system. Search results may also be stored in a global cache 308 so that searches for popular terms are not duplicated.

The ranking module 306 can use a variety of criteria to rank search results. The ranking module 306 may use the reputation of a user on the social networking system 200 as a basis for ranking search results. This means that posts from users with low reputations, which may comprise spammers or malicious users, would appear lower in the results presentation than posts from users with higher reputations.

The ranking module 306 may also utilize a "popularity" ranking, or a ranking by the interactions by population. Some users may be more "popular" on a social networking system 200 than other users. These more popular users have more interactions than other users. Thus, a metric such as a popularity score may be used to rank the search results by users having a higher popularity score than those with lower popularity scores.

Another basis for ranking search results includes similarity measures between the post/post author and the searching user. The similarity score may be measured based on demographic information (age, gender, location, interests, etc.) or other similarity measures based on social graph information. Search results may be ranked, in one embodiment, so that post authors having similar demographic information as the searching user appear higher in the search results than content authors having different demographic information.

Search results may be ranked such that posts from authors closer to the searching user in proximity on a social graph appear higher than posts from authors further away from the searching user on the social graph. Proximity on the social graph may be determined using multiple factors. For example, a user may be directly connected to a set of users and indirectly connected to another set of users. Direct connections have a closer proximity to the searching user than indirect connections.

Another factor that may be used to determine proximity on the social graph is the affinity of the searching user for other users. As an example, a searching user who interacts with a connection regularly on the social networking system would have a high affinity for the connection. Thus, search results from that connection may be ranked higher because of the closer proximity on the social graph to the searching user as determined by calculating a proximity score.

Yet another ranking scheme may incorporate affinity for other nodes on the social networking system as a basis for ranking search results. For example, the searching user may have a particularly high affinity for a node on the social networking system representing a social online puzzle game. In one embodiment, a ranking module 306 may receive the searching user's high affinity for puzzle games and return posts from other users on the social networking system that also have a high affinity for puzzle games. In this way, the first few retrieved posts may be more relevant to the searching user because of the shared affinity for puzzle games. In this way, the ranking may be "personalized" for the searching user because the ranking incorporates the personal affinities for other nodes on the social networking system (or on the Internet in general in some embodiments).

Because of ease of interactions between users through a social networking system, certain terms may be more popular at a certain point in time, especially during major events. As a result, a global cache 308 may be utilized so that duplicative searches for the same terms are avoided. For example, the death of a celebrity may spur users of the social networking system to post links to news articles, videos, status updates, and the like. Searching users may wish to query the posts of his or her connections on the social networking system regarding the death of the celebrity. Using a global cache 308, duplicative searches may be avoided.

Finally, the real time search engine 240 may include search results from users unconnected to the searching user. Different combinations of ranking may result in unconnected users making new connections because of shared affinities, demographics, or random search results. The real time search engine 240 also searches all nodes connected to the social networking system 200, such as entities, applications, websites, as well as events and groups. Advertisers may also make advertisements searchable such that relevant advertisements also appear in the search results.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a post from a user;
   determining a user identifier associated with the user, a post identifier associated with the post, and a term identifier associated with a term in the post;
   selecting a partition of a user-term index that is associated with the user identifier from among a plurality of partitions of the user-term index; and
   indexing the term of the post and the post identifier into the selected partition of the user-term index based upon the user identifier and term identifier.

2. The method of claim 1, wherein indexing the term of the post and the post identifier into the selected partition of the user-term index comprises:
   selecting a record in a most recent database shard of the selected partition of the user-term index, the record comprising the user identifier, the term identifier, and a list of post identifiers; and
   adding the post identifier into the list of post identifiers of the selected record in the most recent database shard.

3. The method of claim 1, wherein selecting the partition of the user-term index that is associated with the user identifier comprises:
   performing a hash function to associate the user identifier to a particular partition of the user-term index; and
   selecting the particular partition of the user-term index.

4. The method of claim 1, wherein the selected partition of the user-term index comprises a plurality of database shards organized by time, and indexing the term of the post and the post identifier into the selected partition of the user-term index comprises:
   selecting a record in a most recent database shard of the plurality of database shards, the record comprising the user identifier, the term identifier, and a list of post identifiers; and
   adding the post identifier into the list of post identifiers of the selected record in the most recent database shard.

5. The method of claim 2, wherein determining the term identifier comprises:
   performing a hash function on the term to generate the term identifier;
   querying for the term identifier in an object store associated with the most recent database shard in the selected partition of the user-term index; and
   allocating memory in the object store for the term identifier responsive to not finding the term identifier in the object store.

6. The method of claim 3, wherein the hash function takes a modulo of the user identifier by the number of partitions.

7. The method of claim 4, wherein the plurality of database shards comprises a shard for each day of the month, a shard for each month of the year, or a shard for each hour of the day.

8. The method of claim 4, further comprising:
   determining that all of the shards are filled to capacity; and
   creating a new shard, and setting the new shard as the most recent database shard.

9. A system comprising:
   a server configured to receive a post from a user;
   a real time search engine comprising an indexing module configured to determine a post identifier of the post and a term identifier of a term in the post and an aggregator module configured to determine a user identifier of the user,
   a forward index configured to store the received post based upon the post identifier; and
   a user-term index comprising a plurality of partitions,
   wherein the aggregator module is further configured to select a partition of the user-term index that is associated with the user identifier from among the plurality of partitions of the user-term index and the indexing module is further configured to index the term of the post and the post identifier based upon the user identifier and the term identifier.

10. The system of claim 9, wherein the indexing module is further configured to:
    select a record in a most recent database shard of the selected partition of the user-term index, the record comprising the user identifier, the term identifier, and a list of post identifiers; and
    add the post identifier into the list of post identifiers of the selected record in the most recent database shard.

11. The system of claim 9, wherein the indexing module is configured to:
    perform a hash function to associate the user identifier to a particular partition of the user-term index; and
    select the particular partition of the user-term index.

12. The system of claim 9, wherein the selected partition of the user-term index comprises a plurality of database shards organized by time, and the indexing module is further configured to:
    select a record in a most recent database shard of the plurality of database shards, the record comprising the user identifier, the term identifier, and a list of post identifiers; and
    add the post identifier into the list of post identifiers of the selected record in the most recent database shard.

13. The system of claim 10, wherein the indexing module is further configured to:

perform a hash function on the term to generate the term identifier;

query the term identifier in an object store associated with the most recent database shard in the selected partition of the user-term index; and allocate memory in the object store for the term identifier responsive to not finding the term identifier in the object store.

14. The system of claim 11, wherein the hash function takes the modulo of the user identifier by the number of partitions.

15. The system of claim 12, wherein the plurality of database shards comprises a shard for each day of the month, a shard for each month of the year, or a shard for each hour of the day.

16. The system of claim 12, wherein the number of database shards fluctuates over time.

17. The system of claim 12, the indexing module is further configured to:

determine that all of the shards are filled to capacity; and create a new shard, and setting the new shard as the most recent database shard.

\* \* \* \* \*